US010275529B1

(12) United States Patent
Cronin et al.

(10) Patent No.: US 10,275,529 B1
(45) Date of Patent: Apr. 30, 2019

(54) ACTIVE CONTENT RICH MEDIA USING INTELLIGENT PERSONAL ASSISTANT APPLICATIONS

(71) Applicant: Rich Media Ventures, LLC, Miami, FL (US)

(72) Inventors: John Cronin, Bonita Springs, FL (US); Neil Balthaser, Montreal (CA); Colby Brian Springer, San Francisco, CA (US)

(73) Assignee: RICH MEDIA VENTURES, LLC, Miami, FL (US)

( * ) Notice: Subject to any disclaimer, the term of this patent is extended or adjusted under 35 U.S.C. 154(b) by 0 days.

(21) Appl. No.: 15/142,350

(22) Filed: Apr. 29, 2016

(51) Int. Cl.
G06F 17/30 (2006.01)
(52) U.S. Cl.
CPC .. G06F 17/30864 (2013.01); G06F 17/30899 (2013.01)
(58) Field of Classification Search
None
See application file for complete search history.

(56) References Cited

U.S. PATENT DOCUMENTS

| 6,014,427 | A | 1/2000 | Hanson et al. |
| 6,167,404 | A | 12/2000 | Morcos et al. |
| 6,553,361 | B1 | 4/2003 | Compton et al. |
| 6,741,959 | B1 * | 5/2004 | Kaiser ............... G06F 17/3069 704/7 |
| 6,763,226 | B1 | 7/2004 | McZeal, Jr. |
| 7,212,614 | B1 | 5/2007 | Burg et al. |
| 7,848,765 | B2 | 12/2010 | Phillips et al. |
| 8,001,471 | B2 | 8/2011 | Shaver et al. |
| 8,095,648 | B2 | 1/2012 | MacLeod et al. |
| 8,296,383 | B2 * | 10/2012 | Lindahl ............... G10L 15/30 379/93.24 |
| 8,307,092 | B2 | 11/2012 | Svendsen |
| 8,554,600 | B2 | 10/2013 | Reisman |
| 8,615,596 | B1 | 12/2013 | Upadhyay et al. |
| 8,706,091 | B2 | 4/2014 | Baird |
| 8,897,760 | B1 | 11/2014 | Nasserbakht et al. |
| 8,924,335 | B1 | 12/2014 | Trefler et al. |
| 9,053,124 | B1 | 6/2015 | Dornquast et al. |

(Continued)

OTHER PUBLICATIONS

U.S. Appl. No. 15/142,046 Office Action dated Aug. 8, 2016.
(Continued)

Primary Examiner — Amresh Singh
(74) Attorney, Agent, or Firm — Polsinelli LLP

(57) ABSTRACT

The systems and methods are directed towards embodiments for incorporating alternative sources of information, other than current online sources, for use with intelligent personal assistants. These alternative sources are processed and prioritized by the intelligent personal assistant when performing queries by the user. Furthermore, the intelligent personal assistant is capable of performing other actions related to the alternative source of information. In another embodiment, the user is capable of providing both audio commands and motion-based commands to the intelligent personal assistant to instruct the intelligent personal assistant to perform specific processes whereby the audio commands correspond to a first set of processes and the motion-based commands correspond to a distinct second set of processes.

14 Claims, 10 Drawing Sheets

(56) References Cited

U.S. PATENT DOCUMENTS

| | | | |
|---|---|---|---|
| 9,292,834 B2 | 3/2016 | Patel et al. | |
| 9,600,769 B1 | 3/2017 | Liu et al. | |
| 9,736,311 B1 | 8/2017 | Cronin | |
| 2002/0015042 A1* | 2/2002 | Robotham | G06F 3/14 345/581 |
| 2002/0049975 A1 | 4/2002 | Thomas et al. | |
| 2002/0194293 A1 | 12/2002 | Osman | |
| 2003/0078960 A1 | 4/2003 | Murren et al. | |
| 2003/0126613 A1 | 7/2003 | McGuire | |
| 2003/0157968 A1 | 8/2003 | Boman et al. | |
| 2003/0172145 A1 | 9/2003 | Nguyen | |
| 2005/0125717 A1 | 6/2005 | Segal et al. | |
| 2005/0256941 A1 | 11/2005 | Armstrong et al. | |
| 2006/0123080 A1 | 6/2006 | Baudino et al. | |
| 2006/0139312 A1 | 6/2006 | Sinclair | |
| 2007/0152058 A1 | 7/2007 | Yeakley et al. | |
| 2007/0266170 A1 | 11/2007 | Mockett | |
| 2008/0066129 A1 | 3/2008 | Katcher et al. | |
| 2008/0091175 A1 | 4/2008 | Frikart et al. | |
| 2008/0184157 A1 | 7/2008 | Selig | |
| 2008/0320483 A1 | 12/2008 | Hou et al. | |
| 2009/0222709 A1 | 9/2009 | Lin et al. | |
| 2009/0270170 A1 | 10/2009 | Patton | |
| 2009/0299840 A1 | 12/2009 | Smith | |
| 2010/0030889 A1 | 2/2010 | Fuchs et al. | |
| 2010/0057785 A1 | 3/2010 | Khosravy et al. | |
| 2010/0058220 A1 | 3/2010 | Carpenter | |
| 2010/0174722 A1 | 7/2010 | Carteri | |
| 2010/0198880 A1 | 8/2010 | Petersen | |
| 2011/0208616 A1 | 8/2011 | Gorman et al. | |
| 2011/0208822 A1 | 8/2011 | Rathod | |
| 2011/0208831 A1 | 8/2011 | Ho et al. | |
| 2012/0042025 A1 | 2/2012 | Jamison et al. | |
| 2012/0070129 A1 | 3/2012 | Lin et al. | |
| 2012/0072936 A1 | 3/2012 | Small et al. | |
| 2012/0143693 A1 | 6/2012 | Chung et al. | |
| 2012/0167001 A1 | 6/2012 | Ortize et al. | |
| 2012/0232906 A1 | 9/2012 | Lindahl | |
| 2012/0239417 A1 | 9/2012 | Pourfallah et al. | |
| 2013/0074003 A1 | 3/2013 | Dolenc | |
| 2013/0094834 A1 | 4/2013 | Laksono et al. | |
| 2013/0124759 A1 | 5/2013 | Strober | |
| 2013/0159443 A1 | 6/2013 | Dellenbach et al. | |
| 2013/0166372 A1 | 6/2013 | Abraham et al. | |
| 2013/0260350 A1 | 10/2013 | Kutty et al. | |
| 2013/0290234 A1* | 10/2013 | Harris | G06N 5/022 706/46 |
| 2014/0019352 A1 | 1/2014 | Shrivastava | |
| 2014/0129303 A1 | 5/2014 | Aiglstorfer | |
| 2014/0130036 A1 | 5/2014 | Gurikar et al. | |
| 2014/0188803 A1 | 7/2014 | James et al. | |
| 2014/0214429 A1 | 7/2014 | Pantel | |
| 2014/0244399 A1 | 8/2014 | Orduna et al. | |
| 2014/0323817 A1 | 10/2014 | el Kaliouby et al. | |
| 2015/0073907 A1* | 3/2015 | Purves | G06Q 20/32 705/14.58 |
| 2015/0092520 A1 | 4/2015 | Robison et al. | |
| 2015/0100229 A1 | 4/2015 | Zhao | |
| 2015/0106221 A1 | 4/2015 | Tapley et al. | |
| 2015/0128058 A1 | 5/2015 | Anajwala | |
| 2015/0156028 A1 | 6/2015 | Ballard et al. | |
| 2015/0178511 A1 | 6/2015 | Klappert et al. | |
| 2015/0186533 A1 | 7/2015 | Patil et al. | |
| 2015/0199961 A1 | 7/2015 | Arkko et al. | |
| 2015/0253885 A1 | 9/2015 | Kagan et al. | |
| 2015/0254216 A1 | 9/2015 | DeLuca et al. | |
| 2015/0278348 A1 | 10/2015 | Paruchuri et al. | |
| 2015/0309702 A1 | 10/2015 | Butler et al. | |
| 2015/0348549 A1 | 12/2015 | Giuli et al. | |
| 2016/0012465 A1 | 1/2016 | Sharp | |
| 2016/0037251 A1 | 2/2016 | Daniels | |
| 2016/0151674 A1 | 6/2016 | Rauhala et al. | |
| 2016/0165387 A1 | 6/2016 | Nhu | |
| 2016/0307095 A1 | 10/2016 | Li et al. | |
| 2016/0357761 A1 | 12/2016 | Siracusa et al. | |
| 2016/0360382 A1 | 12/2016 | Gross et al. | |
| 2017/0324869 A1 | 11/2017 | Cronin | |

OTHER PUBLICATIONS

U.S. Appl. No. 15/142,053 Office Action dated Aug. 4, 2016.
U.S. Appl. No. 15/142,038 Office Action dated Jul. 27, 2016.
U.S. Appl. No. 15/142,100 Office Action dated Jul. 26, 2016.
Naftali, M. et al.; "Accessibility in context: understanding the truly mobile experience of smartphone users with motor impairments." In Proceedings of the 16th international ACM SIGACCESS conference on Computers & accessibility (pp. 209-216). ACM. DOI: 10.1145/2661334.2661372 (Oct. 2014).
Raveendran, V. et al.; "Speech only interface approach for personal computing environment." In Engineering and Technology (ICETECH), 2016 IEEE International Conference on (p. 372-377). IEEE. DOI: 10.1109/ICETECH.2016.7569279 (Mar. 2016).
Sobeth, T. et al.; "DIVINE: Building a Wearable Device for Intelligent Control of Environment Using Google Glass." Computer and Information Technology; Ubiquitous Computing and Communications; Dependable, Autonomic and Secure Computing; Pervasive Intelligence and Computing; Pervasive Intelligence and Computing (CIT/UCC/DASC/PICOM), 2015 IEEE International Conference on Computer and Information Technology. (Oct. 2015).
Valizadeh, E.; "A Survey of Smartwatch Platforms from a Developer's Perspective." (Apr. 2015).
U.S. Appl. No. 15/142,372 Office Action dated Dec. 13, 2016.
U.S. Appl. No. 15/142,033 Office Action dated Dec. 30, 2016.
U.S. Appl. No. 15/142,046 Final Office Action dated Dec. 27, 2016.
U.S. Appl. No. 15/142,053 Final Office Action dated Dec. 22, 2016.
U.S. Appl. No. 15/142,055 Office Action dated Nov. 4, 2016.
U.S. Appl. No. 15/142,038 Final Office Action dated Jan. 27, 2017.
U.S. Appl. No. 15/142,100 Final Office Action dated Jan. 31, 2017.
U.S. Appl. No. 15/142,372 Final Office Action dated Jun. 22, 2017.
U.S. Appl. No. 15/142,033 Final Office Action dated Jul. 13, 2017.
U.S. Appl. No. 15/142,038 Office Action dated Jun. 27, 2017.
U.S. Appl. No. 15/142,046 Office Action dated Apr. 26, 2017.
U.S. Appl. No. 15/142,372 Final Office Action dated Jun. 29, 2017.
U.S. Appl. No. 15/142,055 Final Office Action dated Jun. 20, 2017.
U.S. Appl. No. 15/661,780 Office Action dated Aug. 15, 2017.
U.S. Appl. No. 15/661,780, John Cronin, Rich Media Interactive Voice Response, filed Jul. 27, 2017.
SSLShopper "stop the" page contains secure and nonsecure items "warning" pp. 1-2, Sep. 9, 2007.
U.S. Appl. No. 15/142,372 Office Action dated Oct. 12, 2017.
U.S. Appl. No. 15/142,055 Office Action dated Nov. 22, 2017.
U.S. Appl. No. 15/142,372 Office Action dated Feb. 13, 2018.
U.S. Appl. No. 15/142,033 Office Action dated Jan. 12, 2018.
U.S. Appl. No. 15/661,780 Office Action dated Feb. 1, 2018.
U.S. Appl. No. 15/142,100 Office Action dated Dec. 20, 2017.
http://www.youtube.com/watch?v=dxkfOSG79oc "How to reset internet explorer in windows XP" "mytechsupportstore" published: Jul. 1, 2010.
U.S. Appl. No. 15/142,038 Final Office Action dated Apr. 3, 2018.
U.S. Appl. No. 15/142,046 Final Office Action dated Apr. 23, 2018.
U.S. Appl. No. 15/142,372 Final Office Action dated May 17, 2018.

* cited by examiner

System 200

FIG. 3b
Example Wearable Commands

FIG. 4b

SIRI Database of Wearable Commands

SIRI wearable commands 450

| Command | Action | Movement 1 | Movement 2 | Movement 3 |
|---|---|---|---|---|
| Save Web Page to Notes Program | Evernote stores Web page | Clench Hand | Rotate counter clockwise | Pull |
| Send Web page link to "Distribution" | Distribution list receives Web page link | Clench Hand | Rotate counter clockwise | Push |
| email Web Page link to Inbox | Email Inbox receives link | Point finger | Push | |
| --- | --- | --- | --- | --- |
| --- | --- | --- | --- | --- |
| --- | --- | --- | --- | --- |

ACTIVE CONTENT RICH MEDIA USING INTELLIGENT PERSONAL ASSISTANT APPLICATIONS

BACKGROUND OF THE INVENTION

1. Field of the Invention

The present disclosure generally relates to intelligent personal assistants. More specifically, the present disclosure relates to active content rich media used in conjunction with intelligent personal assistants.

2. Description of the Related Art

Intelligent personal assistants are software agents that are incorporated into operating systems of computing devices that assist in the performance of tasks and services for a user. The tasks and services are based on user input, location awareness and an ability to access information from a variety of sources. SIRI® is an example intelligent personal assistant that is implemented in various Apple-related operating systems (e.g., iOS, watchOS and tvOS). SIRI® allows users to utilize natural language to provide queries to SIRI® in order to perform a number of different tasks such as answering questions, providing recommendations, and performing queries using information from one or more web-based networks and services.

There are many other existing intelligent personal assistants that allow for similar functionalities. For example, Cortana™ is implemented in various Microsoft-related products (e.g., Windows 8.1, Windows 10), Samsung S Voice™ is implemented in various Samsung-related products post 2013, and Amazon has Amazon Echo™ (also known as Alexa™). Each allow for voice-based commands to be provided by the user in order to perform various tasks designed to be carried out by their respective intelligent personal assistant.

As noted above, intelligent personal assistants utilize information obtained from various online sources. Different online sources can be queries based on the type of information being requested by the user. For example, the intelligent personal assistants can reference online sources for weather or traffic conditions, news, stock prices, user schedules, retail prices, and queries about the location of a particular restaurant. The online sources may also be third-party networks (e.g., Yelp). One or more online sources can be queried in order to obtain the requested information, if available.

There are, however, plenty of other alternative sources that could also be processed by intelligent personal assistants. There is a need for the implementation of these alternative sources (e.g., books) that allows users to perform queries and other processes using intelligent personal assistants.

SUMMARY OF THE CLAIMED INVENTION

A method for incorporating active content for use with an intelligent personal assistant is claimed. The method includes steps for loading active content into a computing device for use by an intelligent personal assistant. The computing device receives intelligent personal assistant commands from a user whereby the commands dictate the intelligent personal assistant to process the active content. The computing device transmits the active content to an intelligent personal assistant network that is used to parse the active content. The computing device determines whether the received intelligent personal assistant command can be completed using the parsed information from the active content. If the command is recognized, the intelligent personal assistant subsequently accesses the information from the parsed active content using a process that corresponds to the recognized command. The intelligent personal assistant then outputs a response for the user to view whereby the response includes information responsive to the intelligent personal assistant command.

A system for incorporating active content for use with an intelligent personal assistant is claimed. The system includes a user interface for receiving intelligent personal assistant commands from a user. The system also includes memory and a processor. The processor executes instructions to load content into a computing device for use by an intelligent personal assistant. The computing device then receives intelligent personal assistant commands from a user. The commands dictate how the intelligent personal assistant processes the active content. The active content is transmitted to a network to be parsed. The intelligent personal assistant then determines whether the received command can be used with the parsed information from the active content. If the command is recognized, the intelligent personal assistant subsequently accesses the information from the parsed active content using a process that corresponds to the recognized command. The intelligent personal assistant then outputs a response for the user to view whereby the response includes information responsive to the intelligent personal assistant command.

A non-transitory computer readable storage medium having embodied thereon a program executable by a processor to perform a method for incorporating active content for use with an intelligent personal assistant is claimed. The method includes steps for loading active content into a computing device for use by an intelligent personal assistant. The computing device receives intelligent personal assistant commands from a user whereby the commands dictate the intelligent personal assistant to process the active content. The computing device transmits the active content to an intelligent personal assistant network that is used to parse the active content. The computing device determines whether the received intelligent personal assistant command can be completed using the parsed information from the active content. If the command is recognized, the intelligent personal assistant subsequently accesses the information from the parsed active content using a process that corresponds to the recognized command. The intelligent personal assistant then outputs a response for the user to view whereby the response includes information responsive to the intelligent personal assistant command.

BRIEF DESCRIPTION OF THE DRAWINGS

FIG. 3B illustrates a database associating wearable motion-based commands (e.g., gestures) with corresponding commands performed by the intelligent personal assistant.

FIG. 4B illustrates the database of wearable commands.

DETAILED DESCRIPTION

The systems and methods as described in the present disclosure are directed towards providing alternative sources of information (e.g., books), other than current online sources, for use with intelligent personal assistants. These alternative sources of information will be referred to herein as active content rich media. These alternative sources (e.g., active content rich media) are processed and prioritized by the intelligent personal assistant when performing queries by the user. In situations where the requested information may not be found in the active content, online sources may be used alternatively or in conjunction with the active content. Furthermore, the intelligent personal assistant is capable of performing other actions related to the alternative source of information.

Rich media, as used in the present disclosure, refers to content that may include text (i.e. words) or images (i.e. pictures) to convey information to the user, but may also include or utilize a variety of advanced features such as video and audio that encourages viewers to interact and engage with the content being viewed. The content discussed herein may include a variety of rich media, as well as traditional text or image content.

In other embodiments, an intelligent personal assistant is capable of understanding and distinguishing audio and motion-based commands from the user in order to perform one or more pre-determined processes whereby the audio commands may correspond to a first set of processes and the motion-based commands correspond to a distinct second set of processes. The user provides the audio commands through the use of a microphone while motion-based commands are provided by the user through the use of one or more wearable devices.

Figure 1:
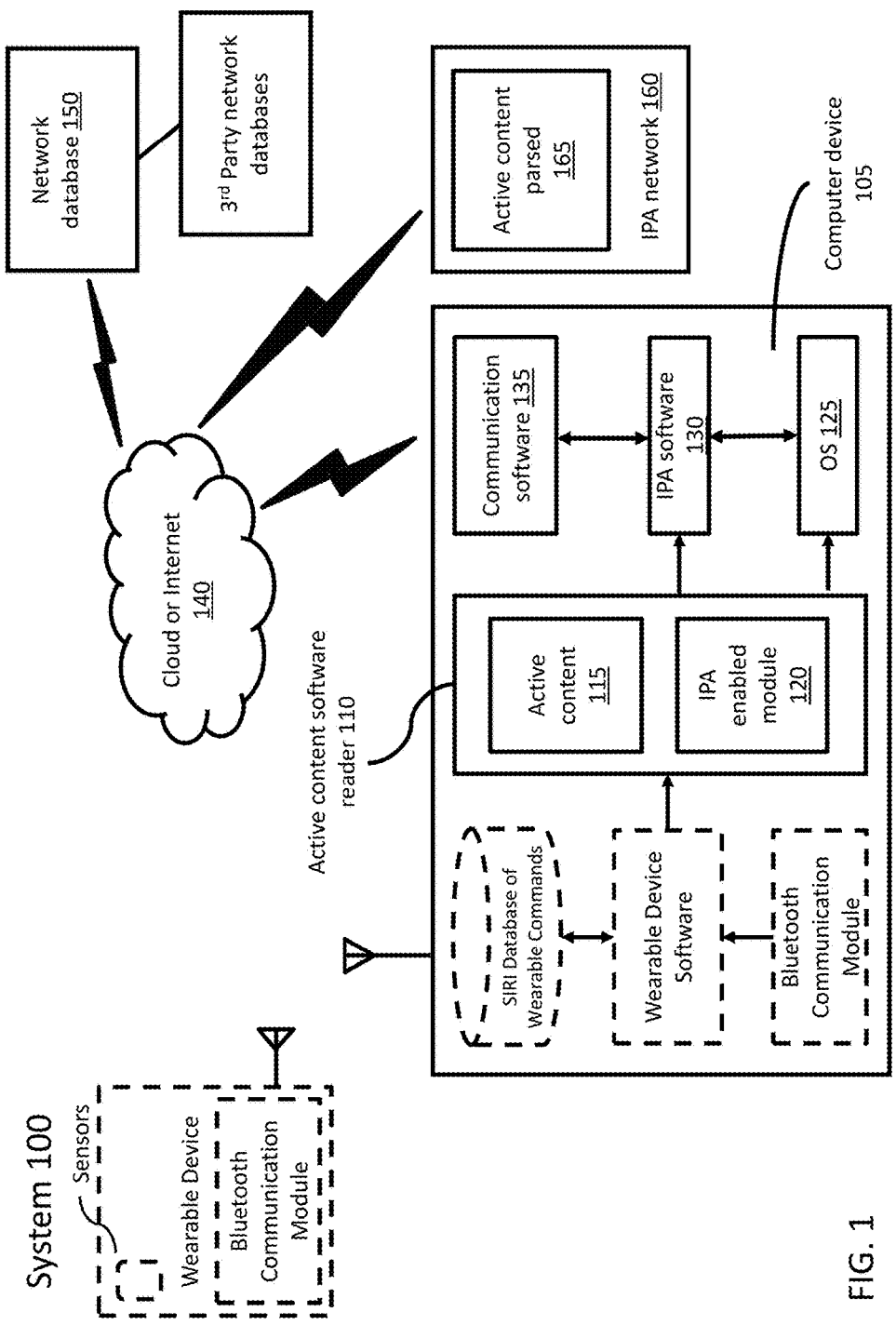
FIG. 1 illustrates a system for a computing device with active content software reader.

FIG. 1 illustrates a system 100 for a computing device with active content software reader. More specifically, a user is capable of incorporating an alternative data source (e.g., active content) that can be prioritized by the intelligent personal assistant when performing various queries based on user requests. Ordinarily, intelligent personal assistants (e.g., SIRI®) utilize various online sources 150 to obtain information for queries from users. For example, if the user is requesting information about weather in a particular location, the intelligent personal assistant can look up in a weather-based online source and return the relevant information for the user to view. In embodiments, the online sources also include third-party databases that are managed by a particular business or company. For example, existing online services such as Yelp, Open Table and Fandango can be communicated with in order to obtain information about reviews, reservation availability and movie times for the user.

The system 100 provides an alternative and/or supplement to the use of online sources 150 with available alternative data sources (e.g., active content 115) that may be provided by the user. For example, the user would be capable of using one or more documents (e.g., electronic books) stored on the computing device. The intelligent personal assistant can process the information associated with, for example, the electronic book and subsequently prioritize the information in the electronic book when responding to user queries. In this way, the intelligent personal assistant would not need to search for the requested information from various online sources 150 but rather can focus on fulfilling the request based on the provided source (e.g., electronic book).

It may be that the information from active content 115 is prioritized until a query is unable to yield a result for the user to view. In that case, the intelligent personal assistant could be instructed to perform a search for the requested information from online sources 150.

With reference to FIG. 1, the functionality of the intelligent personal assistant involving active content 115 would be found in various types of computing devices 105. Such computing devices 105 can include stationary computer devices (e.g., desktops) as well as mobile computer devices (e.g., laptops, smartphones, tablets).

The computing device 105 of FIG. 1 includes various elements including an operating system (OS) 125, software for the operation of the intelligent personal assistant (130) and communication software 135. These elements facilitate operation of the computing device 105 and the intelligent personal assistant (e.g., SIRI®) as known in the art. The incorporation of the active content software reader 110, however, adds the additional functionality for using active content 115 with the intelligent personal assistant. For example, the active content software reader 110 can be implemented using text-to-speech software (e.g., Natural Reader®) so that text (e.g., e-books, Word documents, e-mails, PDF files) can be converted into natural language (e.g., words). The active software reader 110 may also include optical character recognition (OCR) functionalities. Further details regarding the elements of the computing device 105 are provided below.

The OS 125 is a collection of software that manages the computer device resources and provides common services for the various computer programs/applications found on the computing device 105. The OS 125 is an essential component of the system software that not only facilitates the running of the computer programs/applications found on the computing device 105 but also will be used in facilitating the operation of the intelligent personal assistant software 130 and active content software reader 110. Exemplary OS 125 include, for example, OSX, Linux, MS-DOS and Windows.

The intelligent personal assistant software 130 stored in the computing device 105 contains the software (e.g., instructions, artificial intelligence) used to run the intelligent personal assistant on the computing device 105. The intelligent personal assistant software 130 may include, for example, instructions that direct how queries are processed and carried out upon receiving a user input at the computing device 105. The software 130 may also instruct how the intelligent personal assistant searches for the requested information and provides the requested information for the user. Generally, the intelligent personal assistant software 130 provides the software that would be necessary to carry out the functionality of the intelligent personal assistant on the computing device 105. The functionality of any one intelligent personal assistant may be designed and implemented based on the desire of the manufacturer (e.g., Apple, Samsung).

When a user input (e.g., query) is received by the user, the intelligent personal assistant software 130 connects to the cloud or Internet 140 in order to communicate with the intelligent personal assistant network 160. The network 160 may correspond with a particular intelligent personal assistant (e.g., SIRI®). The intelligent personal assistant network 160 allows the user input to be processed so that the intelligent personal assistant can understand the type of request being provided by the user. After processing the request, the related information can then be obtained from one or more online sources (e.g., network databases 150).

It should be noted that since the intelligence used to process user requests is stored on the cloud/Internet 140, the intelligence is usable by many other users who may ask for similar/same request in the future. The accuracy of the information provided to the user can confirm whether an action is performed by the intelligent personal assistant in a satisfactory fashion. If the user is unsatisfied, future actions can be adjusted in order to obtain more relevant information. In a sense, the intelligent personal assistant is able to learn based on the actions being requested by the various users over time.

With reference back to the computing device 105, the communication software 135 facilitates the flow of information and data between the various elements within the computing device 105 (e.g., intelligent personal assistant software 130, OS 125, active content software reader 110). Additionally, the communication software 135 can include software that facilitates remote access so that different files and messages (e.g., text, audio, video) having different formats can be exchanged between different computing devices and users. The communication software 135 can be implemented, for example, via terminal emulators, file transfer programs, chat and instant messaging programs all incorporated within a multi-user domain (MUD).

Use of the OS 125, intelligent personal assistant software 130 and the communication software 135 in the computer device 105 provides the functionalities that may be currently available in numerous intelligent personal assistants known in the art. As indicated above, queries to the intelligent personal assistant in the computing device 105 are resolved through searches using online sources. With the use of the active content software reader 110, however, the intelligent personal assistant software 130 can be provided with active content 115 (e.g., e-books) that the intelligent personal assistant can prioritize as a source when performing actions requested by the user. What the user is capable of doing with the active content 115 as well as how the intelligent personal assistant uses the active content 115 is defined within the intelligent personal assistant enable module 120.

The active source can be any type of document or file that a user can load onto the computing device 105. Loading the document or file may be facilitated through a graphical user interface (GUI) associated with the intelligent personal assistant software 130 or the active content software reader 110. For example, the user may have the document or file already stored on the computing device 105 or may download the desired document or file from another source (e.g., another computing device, online source). Exemplary documents or files may include e-books, PDF files, text files, Word Documents and e-mails.

Once the document or file has been loaded on the computing device 105 and indicated as an active source 115 to the active content software reader 110, the intelligent personal assistant software may proceed with processing/parsing the information based on the instructions stored in the intelligent personal assistant enabled module 120.

Similar to how the intelligent personal assistant determines what a user input is (e.g., user query) by connecting to the network 160 using the cloud or Internet 140, connection with the network 160 may be required to process/parse the active source 115. Once processed and parsed, the intelligent personal assistant is prepared to perform various actions (e.g., searches) based on user input. The processed and parsed active content may be stored in the intelligent personal assistant network 160.

The types of actions that the intelligent personal assistant is capable of performing with the active source 115 may be pre-defined in the intelligent personal assistant enabled module 120. Furthermore, the intelligent personal assistant enabled module 120 may also include the corresponding user input (e.g., audio commands, motion-based commands) that instructs the intelligent personal assistant to perform particular actions (e.g., FIG. 3A and FIG. 3B). In any case, recognition of the user input and what should be done with the active source 115 is performed in the intelligent personal assistant network 160. However, instead of using online sources 150 to complete the request, the processed and parsed active content 165 is prioritized.

As indicated above, the intelligent personal assistant prioritizes answering user queries using the active content 115 when an active content 115 is provided by the user. In an embodiment, the intelligent personal assistant may utilize the various online sources in situations where the active content 115 does not contain the requested information from the user query. It may be possible as well that even if the requites information is found in active content that the intelligent personal assistant may also supplement with information obtained from online sources.

The inquiries provided by the user either when performing actions with respect to the active content 115 or by using the online sources 150 may be performed using audio-based commands. Alternatively, commands may be provided using user-input in a GUI associated with the computer device 105 (e.g., selection of buttons or command prompt). In an embodiment, the computing device 105 is also capable of receiving instructions from the user via motion-based commands (e.g., gestures). The motion-based command method is implemented using the wearable device software 170, the database of wearable commands 180 and a corresponding wearable device 185. Communication modules associated 175 associated with the computing device 105 and the wearable device 185 facilitate communication of the motion-based commands between the wearable device 185 and the computing device 185. Further details about the motion-based functionality are provided below.

The wearable device software 170 facilitates conversion of motion-based data from the wearable device 185 into corresponding commands using the database of wearable commands 180. The conversion allows the motion-based commands to be recognizable by the intelligent personal assistant so that the appropriate action by the intelligent personal assistant can be performed (via the intelligent personal assistant software 130). The wearable device software 170 receives the motion-based data from the wearable device 185 using the communication module 175. The means of communicating the motion-based data via the communication module 175 may include any method known such as Bluetooth, 3G, 4G, LTE, Wi-FI and RFID.

The motion-based data from the wearable device 185 is obtained from sensors 190 associated with the wearable device 185. The wearable device 185 may be worn, for example on the arm/wrist of the user. Other wearable devices may be worn on other portions of the body of the user based on the type of motion-based data to be obtained. Exemplary sensor 190 may include accelerometers, biometric and light monitors. These sensors 190 are used to capture motion-based data and transmit the data to the computing device 105 using the communication module 185.

The database of wearable commands 180 facilitates the conversion of motion-based data into commands that the intelligent personal assistant can understand and perform. More specifically, as illustrated later in FIG. 3B, the database of wearable commands 180 includes a set of actions that the intelligent personal assistant can perform along with a corresponding motion that the user can perform to invoke that action. For example, if the user twists their wrist in a particular direction, this may indicate the user would want to open a browser that has been indicated in the computing device 105. Other types of motions and corresponding intelligent personal assistant actions can be programmed and stored in the database of wearable commands 180.

By allowing the types of actions that can be recognized and performed by the intelligent personal assistant via voice/audio-based input, tactile (e.g., GUI on the computing device 105) and motion-based to be distinct, this allows the user to perform multiple different types of actions simultaneously by providing separate commands that the intelligent personal assistant can recognize. For example, this may allow the user to indicate that a particular webpage should be opened using one method (e.g., motion-based) and subsequently instruct the intelligent personal assistant to save the webpage using a different method (e.g., voice command). The intelligent personal assistant, via the software 130, can be instructed to prioritize certain commands or perform the actions based on when they are received (e.g., chronologically).

Figure 2:
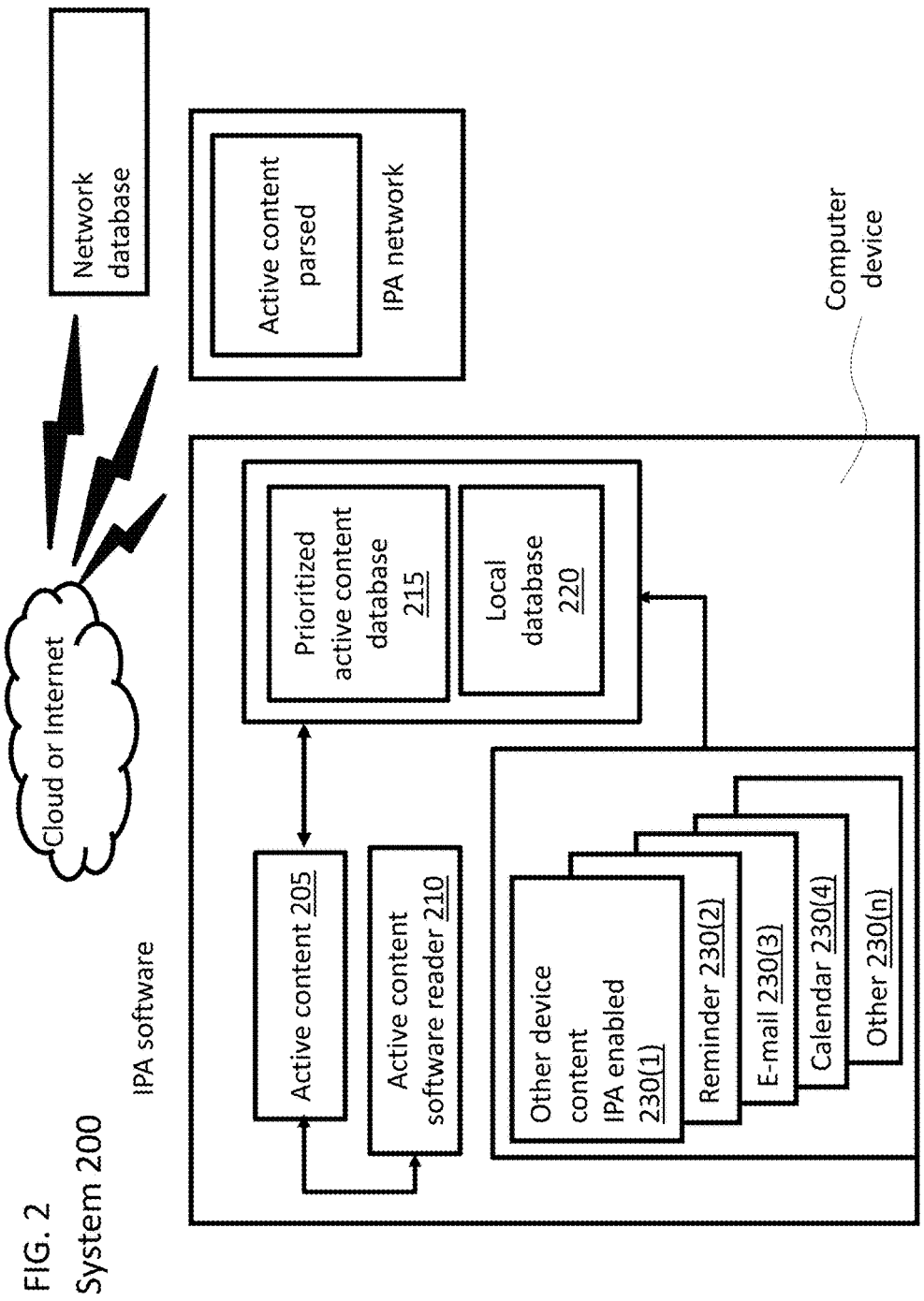
FIG. 2 illustrates a system whereby the computing system includes active content that is prioritized over online information.

FIG. 2 illustrates an embodiment of the computing system where the active content 205 is prioritized over online information. More specifically, when active content 205 has been provided to the intelligent personal assistant software of the computer device (stored in a prioritized active content database 215), the intelligent personal assistant software prioritizes the information in the database 215 from any information obtained from online sources stored in a local database 220.

Users are capable of viewing and interacting with the active content through the use of the active content software reader 210. As described above, the active content software reader 210 includes a number of functionalities that allows the active content to be processed into a form that can be viewed by the user. The active content software reader 210 can also process the active content into a form that can be understood and used by the intelligent personal assistant software.

The use of the intelligent personal assistant alongside active content is not only restricted to viewing and performing queries about the active content. Intelligent personal assistants (e.g., SIRI®) already have functionalities where users can modify, for example, reminders, e-mail and calendar information 230. In embodiments, users would be capable of using the information associated with the active content 205 along with applications associated with the computing device compatible with the intelligent personal assistant.

It should be noted that the active content 205 can be prioritized over the information obtained from online sources. Such prioritization may solely utilize information obtained from the active content 205 (and stored in the prioritized active content database 215) until a query is unable to obtain the appropriate response for the user. In that case, the intelligent personal assistant software can then rely on information from online sources.

Figure 3A:
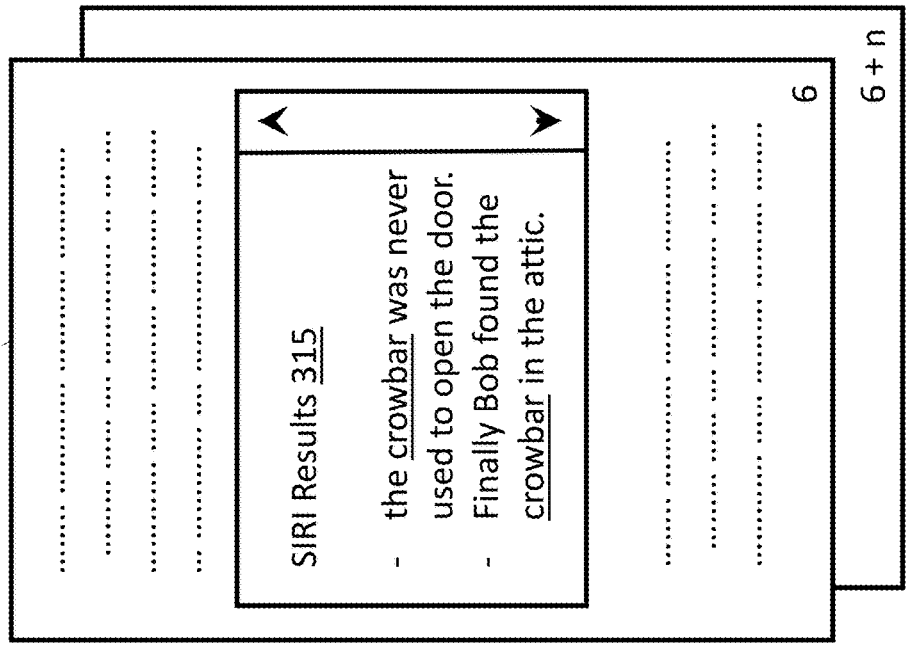
FIG. 3A illustrates an implementation of the intelligent personal assistant using voice commands.

FIG. 3A illustrates an implementation of the intelligent personal assistant using voice commands. More specifically, the intelligent personal assistant (e.g., SIRI®) is being used with respect to an active content.

The active content, as illustrated in FIG. 3A, is a book 300. Other types of active content can also be used with the intelligent personal assistant (e.g., e-mails, PDFs, Word documents). Once processed and parsed, the contents of the book 305 can then be used by the intelligent personal assistant based on user input.

In the example, the user is providing their intelligent personal assistant (e.g., SIRI®) with a voice command: "SIRI, please show all the references to crowbar" 310. The voice command seeks to instruct the intelligent personal assistant to search through the active content (e.g., book 300) in order to find the particular term "crowbar." The intelligent personal assistant can then provide a response to the user based on the search results. As illustrated in the figure, the intelligent personal assistant can provide excerpts from the book 300 where the term "crowbar" was used. If the search for a particular term does not result in any matches (e.g., if "crowbar" was a term that was not found in the book), the intelligent personal assistant can provide an indication that the term was not found in the book.

It should be noted that other functionalities associated with the book 300 can also be performed by the intelligent personal assistant besides merely finding a particular word or phrase. The intelligent personal assistant may be capable of processing information from the book 300 in order to address instructions/questions from the user. For example, the user may ask the intelligent personal assistant to identify a particular aspect about the book (e.g., "Who found the crowbar?"). The instructions/questions would first need to be processed via the intelligent personal assistant network in the cloud in order to determine what type of actions would need to be performed. Once the instructions/questions are processed, the intelligent personal assistant then receives direction as to how to provide a satisfactory output to the user (e.g., word search for the term "crowbar"). The intelligent personal assistant then performs the requested instruction/question based on the received direction.

There may be some user instructions/questions that, even after processing via the intelligent personal assistant network, may be incapable of being performed solely based on the active content (e.g., book 300). For example, if the user requests information about the author or the summary of the book, such information may not be found within the book. In that case, the intelligent personal assistant can then refer to various online sources to provide an output that is related to the user's request.

Figure 3B:
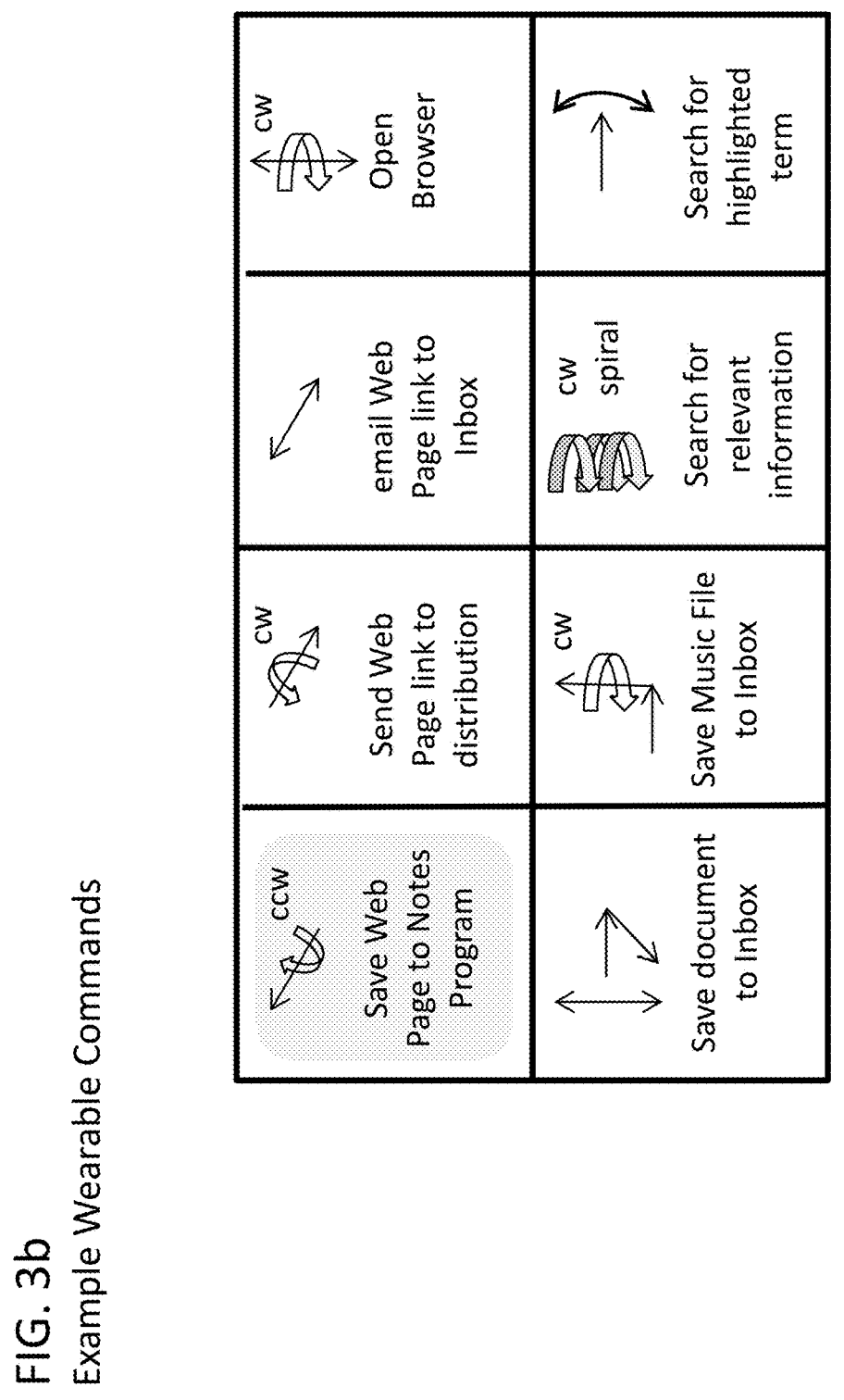

FIG. 3B illustrates wearable motion-based commands (e.g., gestures) with corresponding commands performed by the intelligent personal assistant. More specifically, the wearable motion-based commands (e.g., gestures) are exemplary actions that can be performed by the user in order to instruct the intelligent personal assistant to perform a particular action.

In the above embodiments, the user may provide input via voice-based commands (e.g., audio instructions using native language). In other embodiments, the user may select features (via buttons or menus) or provide instructions via text (e.g., command prompt). The present application further supplements the ability of the user to provide instructions for the intelligent personal assistant by utilizing motion-based commands obtained from the wearable device. By using sensors associated with the wearable device (whereby the wearable device is presumably worn on one arm/wrist of the user), motion-based data can be obtained that quantifies motion data such as movement direction of the arm/wrist of the user.

The exact motion-based data used to distinguish between different commands may be calibrated for each user. For example, the user may be required to run through a program/application whereby each command is performed at least once within a pre-determined period of time so that the intelligent personal assistant can receive motion-based data corresponding to the particular command. Differences between the motion-based commands for each command can then be used to distinguish which command is being referred to later.

It should be noted that FIG. 3B illustrates eight examples involving movement-based data presumably involving the arm/wrist of the user. Other combination of motions (outside the ones illustrated in the figure) can also be used to implement additional commands not currently listed in FIG. 3B. Furthermore, other types of wearable devices and/or sensors can be associated with other areas of the user's body to provide further combinations of motions that can be used to implement additional commands.

Figure 3C:
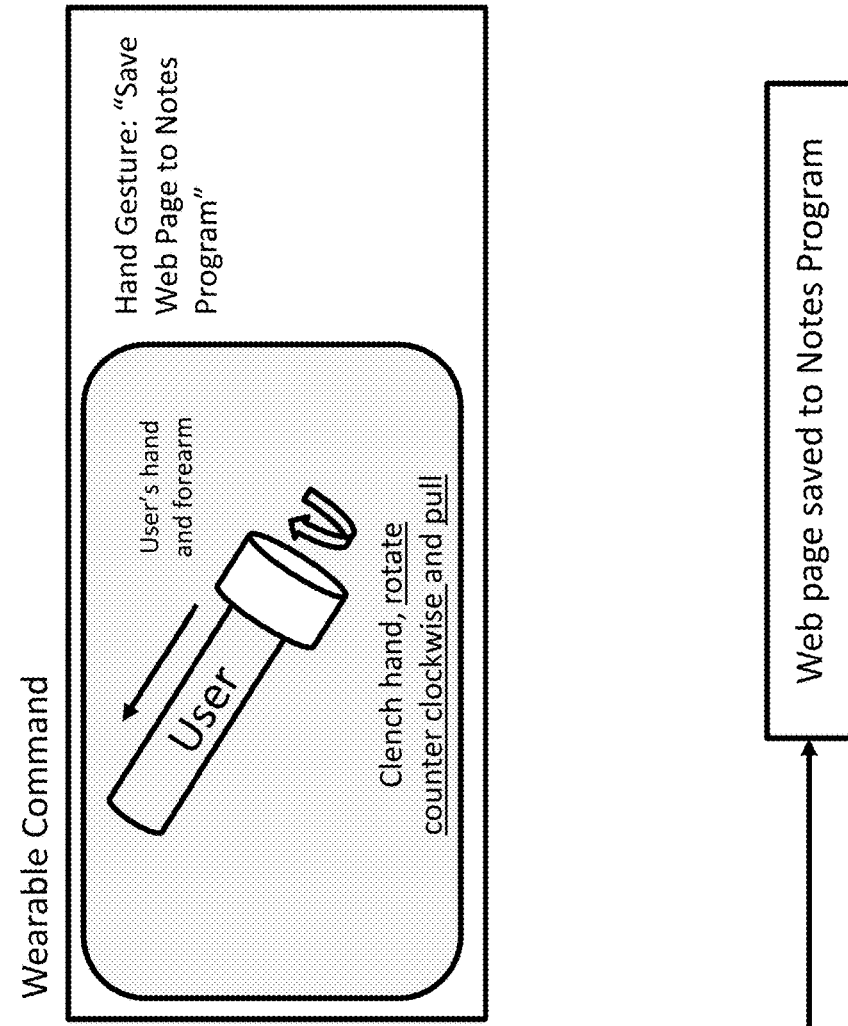
FIG. 3C illustrates an implementation of the intelligent personal assistant using wearable motion-based commands.
Figure 3C:
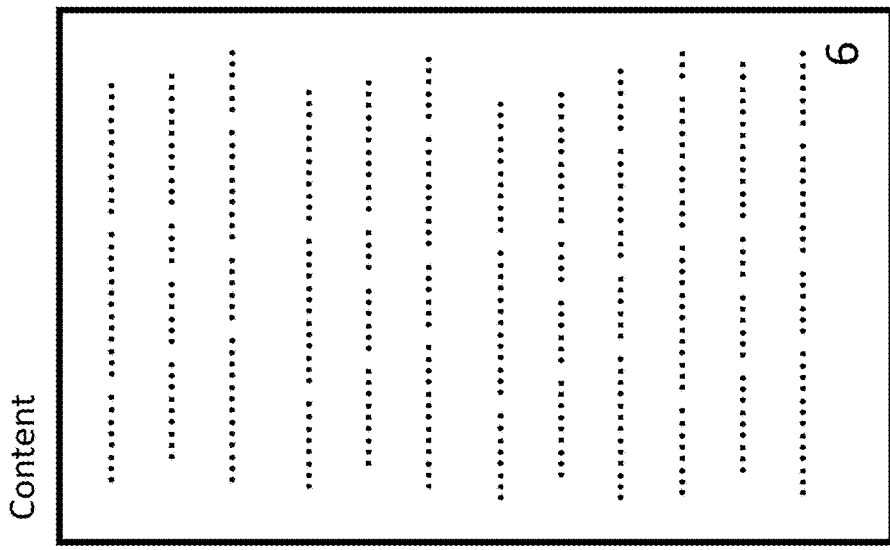

FIG. 3C illustrates an implementation of the intelligent personal assistant using wearable motion-based commands. Similar to the example provided above in FIG. 3A, a user can provide a wearable motion-based command (e.g., gesture) that is recognized by the intelligent personal assistant (e.g., FIG. 3B); the motion-based command will similarly elicit a similar response by the intelligent personal assistant.

Upon receipt of the motion-based command, the intelligent personal assistant software will analyze whether or not the motion-based command is a recognized command. If the received motion-based command is not recognized, indication that such a motion not being recognized may be provided to the user. However, if the motion-based command is recognized, the intelligent personal assistant software will communicate with the intelligent personal assistant network in the cloud/Internet in order to determine what the command corresponds to. In particular, the intelligent personal assistant will receive instructions that correspond to processes that will obtain the desired result based on the user motion-based command. Once the instructions have been carried out by the intelligent personal assistant, notification can be provided to the user indicating that the process has been completed. If information is requested via the motion-based command, the intelligent personal assistant can provide such information to the user at this time.

In the example of FIG. 3C, the user is providing a motion-based command corresponding to a rotation of the hand of the user with a pulling motion involved. This motion-based command corresponds to a "save webpage to notes" command. Upon receipt of the motion-based command, the intelligent personal device determines whether the received command is recognizable. If recognizable, the intelligent personal device proceeds to obtain the necessary instructions to carry out the command from the intelligent personal assistant network and informs the user once the command has been completed.

Figure 4A:
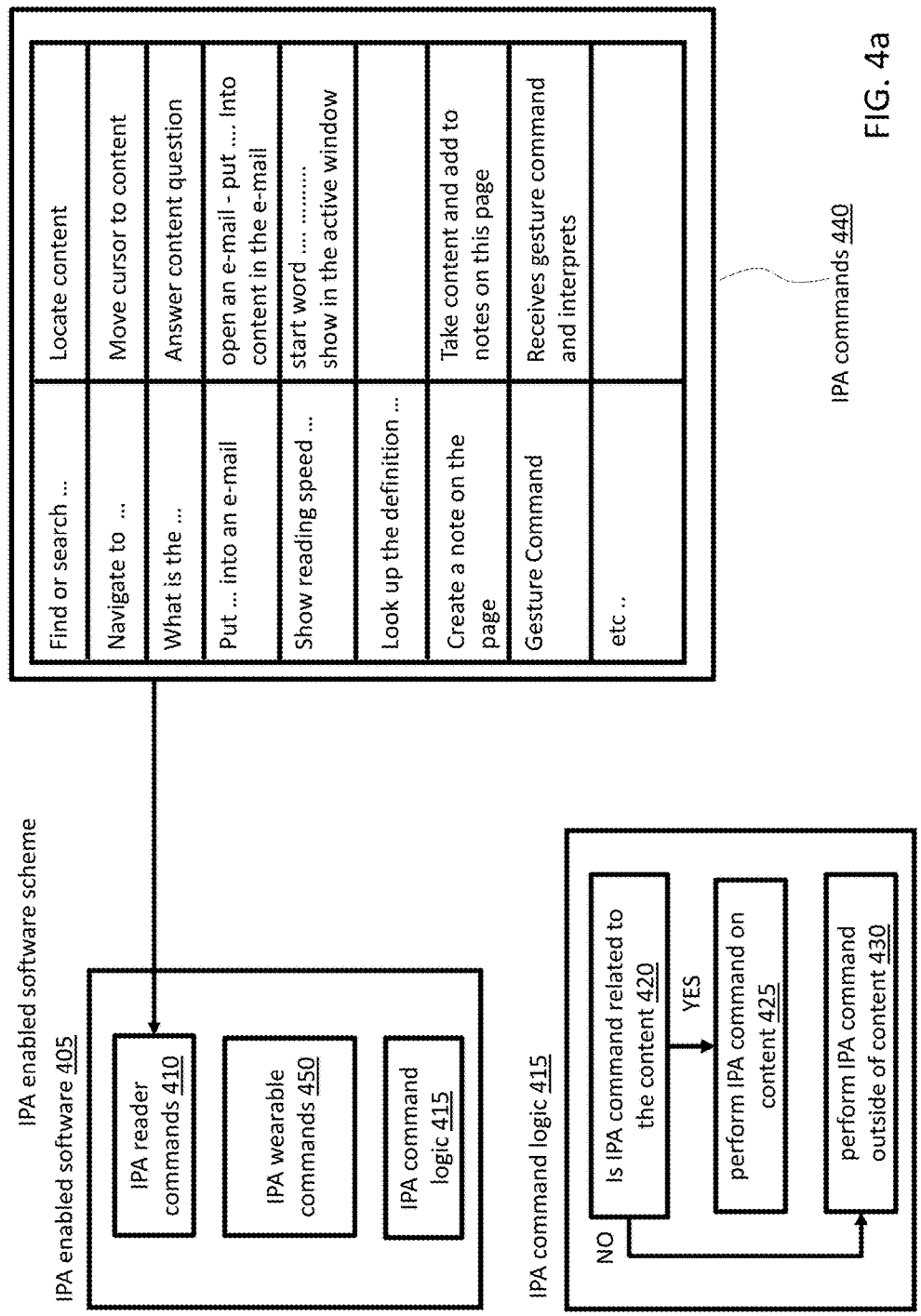
FIG. 4A illustrates the intelligent personal assistant enabled software.

FIG. 4A illustrates the intelligent personal assistant enabled software 405. In particular, the figure provides further details regarding the elements included in the intelligent personal assistant enabled software 405: the intelligent personal assistant reader commands 410 and the intelligent personal assistant command logic 415. Details regarding the intelligent personal assistant wearable commands 450 are provided in FIG. 4B.

With reference to the intelligent personal assistant reader commands 410, this corresponds to all applicable commands 440 that may be used by the intelligent personal assistant. These commands 440 may associate particular phrases that can be provided by the user, for example, in a particular language (via a voice command) with a corresponding process that can be performed by the intelligent personal assistant. In other embodiments, such terms or phrases can be provided via a user command prompt. For example, if the user uses a term "find" or "search", this corresponds to a locate content instruction that instructs the intelligent personal assistant to provide all occurrences of the particular content. Another example may reference the phrase "navigate to." Upon receiving the phrase, the intelligent personal assistant can move a cursor to the designated position.

It should be noted that various additional commands can be implemented with the intelligent personal assistant corresponding with different terms or phrases that a user can provide other than what are shown in FIG. 4A. Furthermore, additional terms/phrases can also be implemented to carry out the same instructions. Such embodiments may utilize synonyms (e.g., terms/phrases that mean the same thing) in order to cover a variety of different terms and phrases that any user can use to mean the same thing. For example, with reference to locating a particular content, not only can the terms "find" or "search" be used, but synonyms (e.g., "locate", "pinpoint") and phrases ("show all occurrences") with similar meaning to "find" and "search" can also be used. It may be possible to modify and customize the various associations between the commands that can be provided by the user and the instructions performed by the intelligent personal assistant in order to incorporate the many ways people can indicate a particular request.

The other element described in FIG. 4A is the intelligent personal assistant command logic 415. The command logic 415 dictates how the intelligent personal assistant performs the request. In particular, the command logic 415 determines whether the request should be performed with the active content 425 or with information found on online sources 430. The determination is reached based on an initial evaluation to check if the command 440 received from the user corresponds to information included in the active content 420. For example, if an exemplary command is to find every occurrence of a particular term within the active content (e.g., book), the command can then be performed on the active content 425. However, if the exemplary command involves looking up a definition of a term within the active content (e.g., book), this may require information not included in the active content. Therefore, the intelligent personal assistant will need to refer to online sources outside of the active content to provide the requested information to the user 430.

It should be noted that different types of logic can be included in the intelligent personal assistant command logic 415 in other embodiments. There may be embodiments where the user would be interested in comparing information found in active content alongside information found through online sources. In this case, the command logic 415 may be modified to implement such functionality where information from both the active content and online sources are obtained and compared prior to providing an output to the user to view.

FIG. 4B illustrates the database of wearable commands. As illustrated in FIG. 4A, the intelligent personal assistant wearable commands 412 are one of the elements of the software 405. The wearable commands 412 facilitates the intelligent personal assistant enabled software 405 to take motion-based data from the user as input and instruct the intelligent personal assistant to perform corresponding tasks. The wearable commands 412, as illustrated in FIG. 4B, dictates the different types of motion-based data that can be received by the user computing device from the wearable device/sensors. The wearable commands 412 also associate the motion-based data with the corresponding instructions for the intelligent personal assistant.

It should be noted that additional motion-based data (e.g., actions) and commands (e.g., instructions for the intelligent personal assistant) can be programmed into the wearable commands database (illustrated in FIG. 4B). The examples illustrated in the figure are provided for illustrative purposes only and are not intended to cover all the possible functionalities for the wearable commands.

In an embodiment, the intelligent personal assistant may be capable of receiving commands from the user that are motion-based commands (from a wearable device) alongside commands (e.g., audio/voice) received from the computing device. It may be desired that the motion-based commands and the audio/voice commands correspond to two distinct set of processes that can be performed by the intelligent personal assistant. For example, the voice/audio based commands can correspond with processing requests within a particular document (e.g., search). Meanwhile, the motion-based commands can be used to process requests with respect to a particular document as a whole (e.g., saving and sending web pages). In this way, a user can provide multiple instructions in succession/near succession that can be independently processed for the intelligent personal assistant.

Figure 5:
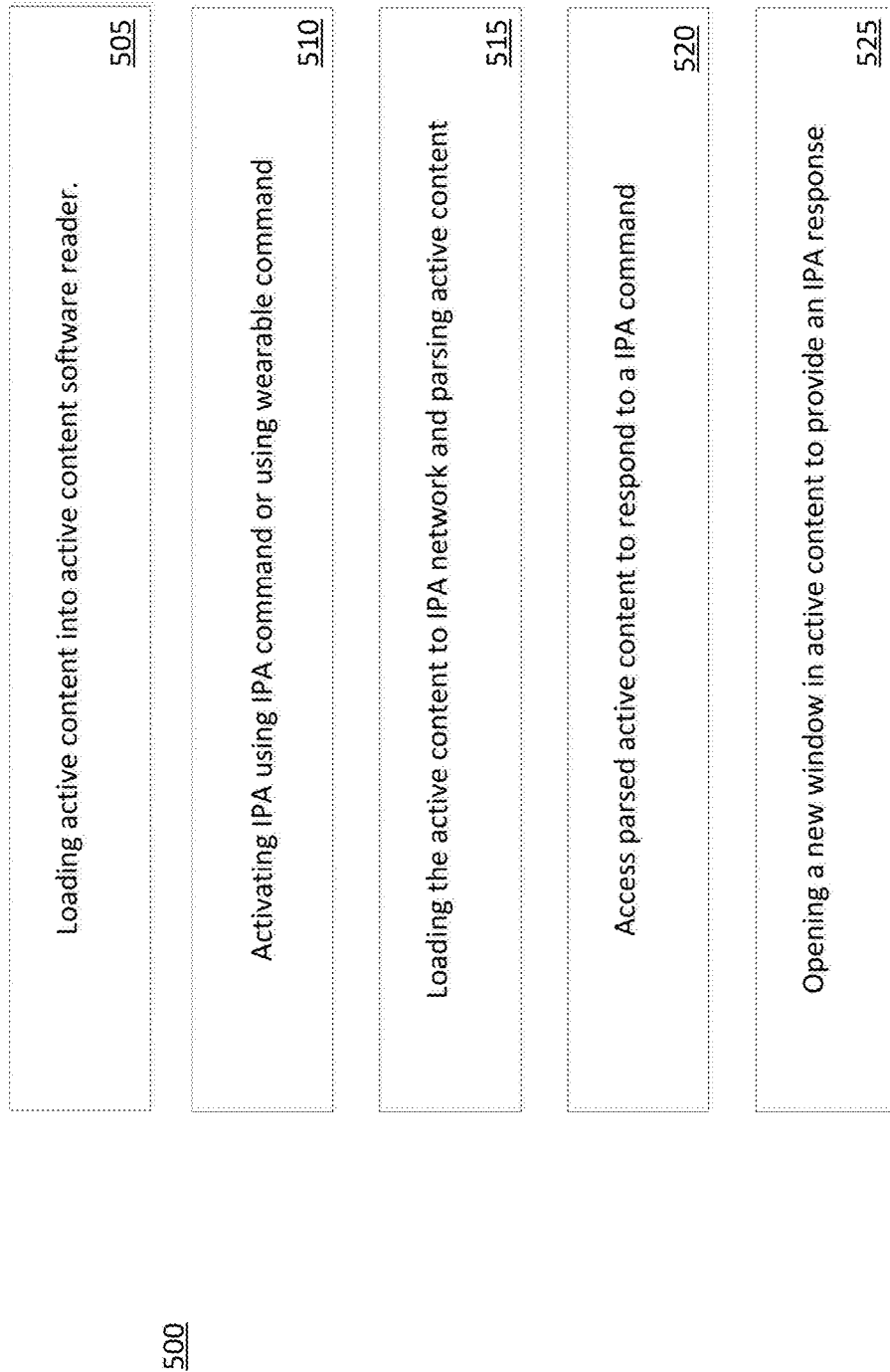
FIG. 5 illustrates the method for incorporating active content for use with the intelligent personal assistant.

FIG. 5 illustrates the method 500 for incorporating active content for use with the intelligent personal assistant. The steps identified in FIG. 5 (and the order thereof) are exemplary and may include various alternatives, equivalents, or derivations thereof including but not limited to the order of execution of the same. For example, in some embodiments the intelligent personal assistant can incorporate the use of information from online sources alongside the active content.

In step 505, the user loads active content into the active content software reader associated with the computing device running the intelligent personal assistant. The active content can be any type of document such as a book, e-mail, PDF, and Word documents. The active content can be prioritized as a source for user requests over online sources that are generally used by the intelligent personal assistant. In situations where a request can be resolved using the active content, the intelligent personal assistant will rely on the active content. When a request cannot be resolved using the active content, the intelligent personal assistant can rely on other sources such as various online sources. In some embodiments, information from both the active content and online sources can be used.

In step 510, the user activates the intelligent personal assistant via an intelligent personal assistant command. The intelligent personal assistant command may include inputs from the user that indicates what processes/actions should be performed. The inputs may include voice/audio commands, inputs associated with a GUI or motion-based commands obtained from wearable devices. The intelligent personal assistant commands provided by the user are evaluated based on known commands stored in memory that corresponds with a corresponding process/action.

In some embodiments, multiple commands can be provided to the intelligent personal assistant. For example, there are embodiments where the intelligent personal assistant includes a database for all voice/audio commands and a separate database for all motion-based commands. These databases can correspond to distinct/non-overlapping processes that can be performed by the intelligent personal assistant upon the request of the user. Therefore, a user can provide a motion-based command to open a particular file. Subsequently, the user can provide a voice command to perform a different task such as processing requests regarding the contents of the document. In this way, the user can complete multiple different tasks more easily.

In step 515, the active content is loaded to the intelligent personal assistant network to be processed and parsed. The processing and parsing of the active content allows the intelligent personal assistant to perform the requests provided by the user.

Based on the received request in step 510, the intelligent personal assistant determines whether the parsed active content is useable with the intelligent personal assistant command. In other words, the intelligent personal assistant command tries and completes the request from the user using the information stored in the parsed active content. As noted above, the active content can be prioritized when performing the request from the user. In situations when the active content is not capable of fulfilling the request, the intelligent personal assistant can utilize online sources.

In step 520, the intelligent personal assistant accesses the parsed active content in order to complete the user request. In step 525, an output to the intelligent personal assistant command is provided to the user using the parsed active content. If an output is not possible, the intelligent personal assistant can utilize other sources (e.g., online sources) to provide requested information based on the command provided by the user. In some embodiments, the intelligent personal assistant can utilize both active content and online sources to supplement each other when fulfilling a user request.

Figure 6:
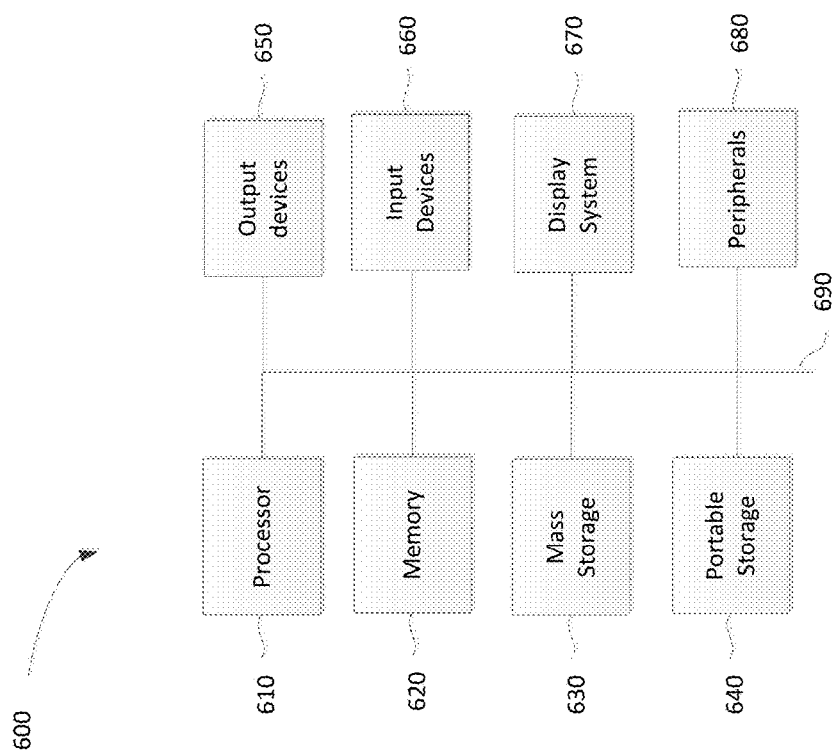
FIG. 6 is a block diagram of an exemplary computing device that may be used to implement an embodiment of the present invention.

FIG. 6 illustrates an exemplary computing system 600 that may be used to implement an embodiment of the present invention. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 7:
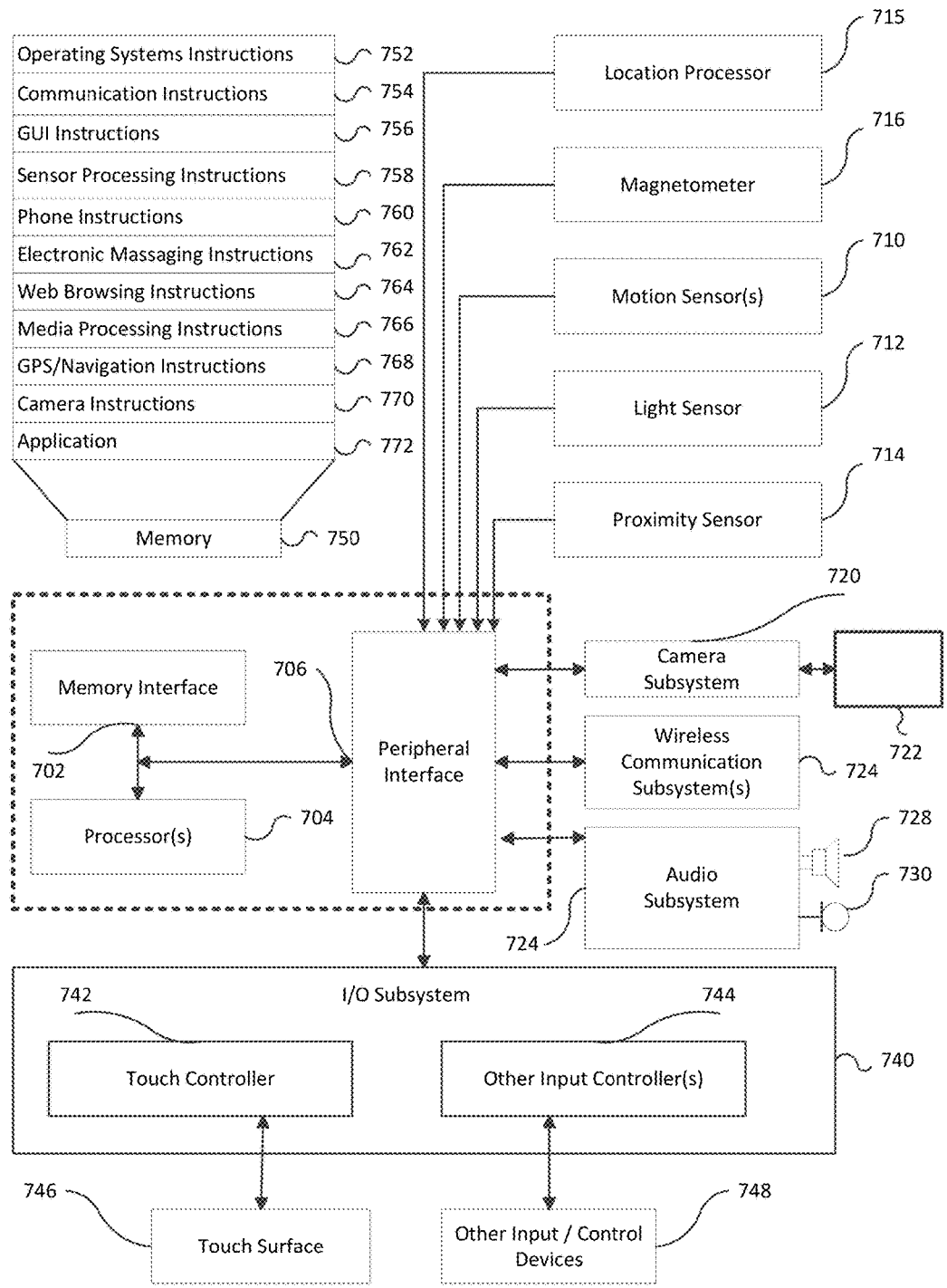
FIG. 7 illustrates a mobile device architecture.

FIG. 7 illustrates a mobile device architecture that may be utilized to implement the various features and processes described herein. Architecture 700 can be implemented in any number of portable devices including but not limited to smart phones, electronic tablets, and gaming devices. Architecture 700 as illustrated in FIG. 7 includes memory interface 702, processors 704, and peripheral interface 706. Memory interface 702, processors 704 and peripherals interface 706 can be separate components or can be integrated as a part of one or more integrated circuits. The various components can be coupled by one or more communication buses or signal lines.

Processors 704 as illustrated in FIG. 7 is meant to be inclusive of data processors, image processors, central processing unit, or any variety of multi-core processing devices. Any variety of sensors, external devices, and external subsystems can be coupled to peripherals interface 706 to facilitate any number of functionalities within the architecture 700 of the exemplar mobile device. For example, motion sensor 710, light sensor 712, and proximity sensor 714 can be coupled to peripherals interface 706 to facilitate orientation, lighting, and proximity functions of the mobile device. For example, light sensor 712 could be utilized to facilitate adjusting the brightness of touch surface 746. Motion sensor 710, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 706, such as a temperature sensor, a biometric sensor, or other sensing device to facilitate corresponding functionalities. Location processor 715 (e.g., a global positioning transceiver) can be coupled to peripherals interface 706 to allow for generation of geo-location data thereby facilitating geo-positioning. An electronic magnetometer 716 such as an integrated circuit chip could in turn be connected to peripherals interface 706 to provide data related to the direction of true magnetic North whereby the mobile device could enjoy compass or directional functionality. Camera subsystem 720 and an optical sensor 722 such as a charged coupled device (CCD) or a complementary metal-oxide semiconductor (CMOS) optical sensor can facilitate camera functions such as recording photographs and video clips.

Communication functionality can be facilitated through one or more communication subsystems 724, which may include one or more wireless communication subsystems. Wireless communication subsystems 724 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 724 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 724 may include hosting protocols such that the device may be configured as a base station for other wireless devices. Communication subsystems can also allow the device to synchronize with a host device using one or more protocols such as TCP/IP, HTTP, or UDP.

Audio subsystem 726 can be coupled to a speaker 728 and one or more microphones 730 to facilitate voice-enabled functions. These functions might include voice recognition, voice replication, or digital recording. Audio subsystem 726 in conjunction may also encompass traditional telephony functions.

I/O subsystem 740 may include touch controller 742 and/or other input controller(s) 744. Touch controller 742 can be coupled to a touch surface 746. Touch surface 746 and touch controller 742 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 746 may likewise be utilized. In one implementation, touch surface 746 can display virtual or soft buttons and a virtual keyboard, which can be used as an input/output device by the user.

Other input controllers 744 can be coupled to other input/control devices 748 such as one or more buttons, rocker switches, thumb-wheels, infrared ports, USB ports, and/or a pointer device such as a stylus. The one or more buttons (not shown) can include an up/down button for volume control of speaker 728 and/or microphone 730. In some implementations, device 700 can include the functionality of an audio and/or video playback or recording device and may include a pin connector for tethering to other devices.

Memory interface 702 can be coupled to memory 750. Memory 750 can include high-speed random access memory or non-volatile memory such as magnetic disk storage devices, optical storage devices, or flash memory. Memory 750 can store operating system 752, such as Darwin, RTXC, LINUX, UNIX, OS X, ANDROID, WINDOWS, or an embedded operating system such as VxWorks. Operating system 752 may include instructions for handling basic system services and for performing hardware dependent tasks. In some implementations, operating system 752 can include a kernel.

Memory 750 may also store communication instructions 754 to facilitate communicating with other mobile computing devices or servers. Communication instructions 754 can also be used to select an operational mode or communication medium for use by the device based on a geographic location, which could be obtained by the GPS/Navigation instructions 768. Memory 750 may include graphical user interface instructions 756 to facilitate graphic user interface processing such as the generation of an interface; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes, camera instructions 770 to facilitate camera-related processes and functions; and instructions 772 for any other application that may be operating on or in conjunction with the mobile computing device. Memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for querying active content via an intelligent personal assistant, the method comprising:

receiving an active content file at a computing device, wherein the active content file is an e-book and that is prioritized over other source files for preparing a response to one or more specified questions;

parsing the prioritized active content file of the e-book using at least text-to-speech conversion, wherein parsing the prioritized active content file of the e-book further includes parsing different information portions of the prioritized active content file of the e-book for use with one or more recognized commands compatible with an intelligent personal assistant of the computing device;

storing the parsed information portions of the prioritized active content file into a database;

receiving a question regarding the content of the e-book;

analyzing the question to identify at least one of the one or more recognized commands and at least one of the parsed information portions of the prioritized active content file associated with providing a response;

applying the at least one identified command to query the at least one parsed information portion for information responsive to the question;

generating a response based on the responsive information, the response generated to be displayed on a display of the computing device;

receiving an indication regarding accuracy of the generated response via a user interface of the computing device; and modifying subsequent responses to the same question when the indication is negative regarding the accuracy of the displayed response.

2. The method of claim 1, further comprising accessing information from online sources when the indication regarding accuracy indicates that the displayed response is not satisfactory, wherein the displayed response is further modified to include information obtained from the online sources.

3. The method of claim 1, wherein a different active content file is prioritized for a different set of specified questions, and wherein the different active content file is one of e-mails, PDFs, and other text-based documents.

4. The method of claim 1, wherein the question is received via a voice/audio-based command.

5. The method of claim 1, wherein the question is received via a motion-based command.

6. The method of claim 5, wherein the motion-based command is obtained from a wearable device that includes at least one sensor.

7. A system for querying active content via an intelligent personal assistant, the system comprising:
   a user interface associated with the computing device that:
      receives an active content file at a computing device, wherein the active content file is an e-book and that is prioritized over other source files for preparing a response to one or more specified questions, and
      receives a question regarding the content of the e-book;
   a processor that executes instructions stored in memory, wherein the processor executes the instructions to:
      parse the prioritized active content file of the e-book using at least text-to-speech conversion, wherein parsing the prioritized active content file of the e-book further includes parsing different information portions of the prioritized active content file of the e-book for use with one or more recognized commands compatible with an intelligent personal assistant of the computing device,
      store the parsed information portions of the prioritized active content file into a database,
      analyze the question to identify at least one of the one or more recognized commands and at least one of the parsed information portions of the prioritized active content file associated with providing a response,
      apply the at least one identified command to query the at least one parsed information portion for information responsive to the question,
      generate a response based on the responsive information,
   the response generated to be displayed on a display of the computing device;
   wherein the user interface receives an indication regarding accuracy of the generated response, and modifies subsequent responses to the same question when the indication is negative regarding the accuracy of the displayed response.

8. The system of claim 7, wherein the processor further executes instructions to access information from online sources when the indication regarding accuracy indicates that the displayed response is not satisfactory, wherein the displayed response is further modified to include information obtained from the online sources.

9. The system of claim 7, wherein a different active content file is prioritized for a different set of specified questions, and wherein the different active content file is one of e-mails, PDFs, and other text-based documents.

10. The system of claim 7, wherein the question is received via a voice/audio-based command.

11. The system of claim 7, wherein the question is received via a motion-based command.

12. The system of claim 11, wherein the motion-based command is obtained from a wearable device that includes at least one sensor.

13. A non-transitory computer readable storage medium having embodied thereon a program executable by a processor to perform a method for querying active content via an intelligent personal assistant, the method comprising:
   receiving an active content file at a computing device, wherein the active content file is an e-book and that is prioritized over other source files for preparing a response to one or more specified questions;
   parsing the prioritized active content file of the e-book using at least text-to-speech conversion, wherein parsing the prioritized active content file of the e-book further includes parsing different information portions of the prioritized active content file of the e-book for use with one or more recognized commands compatible with an intelligent personal assistant of the computing device;
   storing the parsed information portions of the prioritized active content file into a database;
   receiving a question regarding the content of the e-book;
   analyzing the question to identify at least one of the one or more recognized commands and at least one of the parsed information portions of the prioritized active content file associated with providing a response;
   applying the at least one identified command to query the at least one parsed information portion for information responsive to the question;
   generating a response based on the responsive information, the response generated to be displayed on a display of the computing device;
   receiving an indication regarding accuracy of the generated response via a user interface of the computing device; and
   modifying subsequent responses to the same question when the indication is negative regarding the accuracy of the displayed response.

14. The method of claim 1, further comprising querying an online source only when no responsive information to the question result is yielded within the parsed active content file.

* * * * *